United States Patent [19]

Kistler

[11] Patent Number: 4,707,272
[45] Date of Patent: Nov. 17, 1987

[54] METHOD FOR CONTROLLING AND OPTIMIZING THE OPERATION OF A PERFORATED BELT PRESS FOR FILTERING SLURRY

[75] Inventor: François Kistler, Biberist, Switzerland

[73] Assignee: Von Roll AG, Gerlafingen, Switzerland

[21] Appl. No.: 839,773

[22] Filed: Mar. 14, 1986

[30] Foreign Application Priority Data

Mar. 18, 1985 [CH] Switzerland ............... 1224/85

[51] Int. Cl.⁴ .................................. B01D 37/04
[52] U.S. Cl. .................. 210/709; 210/744; 210/746; 210/783
[58] Field of Search ............. 210/739, 744, 745, 783, 210/709, 778, 96.1, 104, 111, 143, 400, 401, 746

[56] References Cited

U.S. PATENT DOCUMENTS

| | | | |
|---|---|---|---|
| 3,348,682 | 10/1967 | Aulich et al. | 210/783 X |
| 4,116,832 | 9/1978 | Tardirel | 210/745 |
| 4,142,971 | 3/1979 | Le Fur et al. | 210/783 X |
| 4,402,834 | 9/1983 | Bastgen et al. | 210/783 X |
| 4,587,023 | 5/1986 | Srivatsa et al. | 210/744 |

Primary Examiner—Tom Wyse
Attorney, Agent, or Firm—Bachman & LaPointe

[57] ABSTRACT

A level measuring sensor is arranged at the start of the straining zone in the perforated belt press and this in particular measures the level change and then regulates the flocculant inflow. In order that the level in the straining zone is stabilized, the perforated belt press must operate in the overflocculation zone. If the flocculant inflow is reduced to the technically possible operating limit, the dry substance content of the filter cake has an optimum value. Thus, the optimization of the control of the operation of the perforated belt press can be reduced to a relatively simple measurement of a level or the time changed thereto.

8 Claims, 7 Drawing Figures

– 4,707,272 –

METHOD FOR CONTROLLING AND OPTIMIZING THE OPERATION OF A PERFORATED BELT PRESS FOR FILTERING SLURRY

BACKGROUND OF THE INVENTION

The present invention relates to a method for controlling the operation of a perforated or screened belt press for filtering slurry, particularly sludge, with two superimposed perforated belts, a straining or filtering zone being formed through the lower belt and following on thereto a pressing zone is formed through the two belts, the drive for the perforated belts, the inflow of slurry, the flocculant addition, the belt tension and the belt nip or squeezing pressure being setable and/or regulatable.

Numerous different methods are known to make it possible to set and also regulate the operating conditions of a perforated belt press. In one known construction (German Patent No. 29 22 988), two independent control loops, namely a sludge throughput control loop with a regulatable sludge pump, a level sensor and a flow quantity meter on the one hand and a flocculant control loop with a regulatable flocculant pump, a sensor for the drainage state of the filter cake by measuring the lateral discharge thereof in the pressing zone and a flocculant quantity meter on the other are provided. If a particular perforated belt speed is set, the sludge throughput and flocculant inflow are regulated by these two control loops. The quality of this regulation is dependent on the measurement of the drainage state, i.e. the shear strength of the filter cake, but this can suddenly change and therefore lead to an incorrect actual value measurement. It is therefore difficult to achieve an optimization of the control of the operation of the perforated belt press.

Whereas in this known construction, there is no automatic adaptation to different slurries with variable drainage characteristics, this is sought in a further known construction (DE-OS No. 33 00 249). Hereagain independent control loops are provided and for the flocculant control loop the freely outflowing filtrate quantity in the straining or filtering zone is used as the reference input. This admittedly replaces the difficultly measurable shear strength of the filter cake by a continuously varying and therefore more easily measurable actual value. However, in actual fact the control quantity for the flocculant control loop is merely a different actual or test value, namely that of the filtrate in place of that of the filter cake. However, as soon as the slurry composition changes, it is also necessary to modify the desired value of the flocculant control loop if the perforated belt press is to be operated in an optimum manner. This optimization is to be achieved by taking account of additional parameters, e.g. the consistency of the slurry, but this makes the regulation much more complicated and costly.

SUMMARY OF THE INVENTION

The problem of the present invention is to so develop a method of the aforementioned type, that it is possible to optimize the control of the operation of the perforated belt press with comparatively limited expenditure on regulating means and with greater precision.

According to the invention this problem is solved in that for the optimization of the dry substance content of the filter cake and the flocculant inflow, the flocculant quantity in the overflocculation zone is only reduced to the extent that the slurry level at the start of the filtering zone is stabilized.

Appropriately, in order to optimize the operation of the perforated belt press, the optimization of the flocculant inflow through the flocculant circuit is combined with the optimization of one or more of the quantities: perforated belt speed, perforated belt tension and perforated belt nip pressure.

BRIEF DESCRIPTION OF THE DRAWINGS

The invention is described in greater detail hereinafter relative to non-limitative embodiments and the attached drawings, which show.

DETAILED DESCRIPTION OF THE PREFERRED EMBODIMENTS

Figure 1:
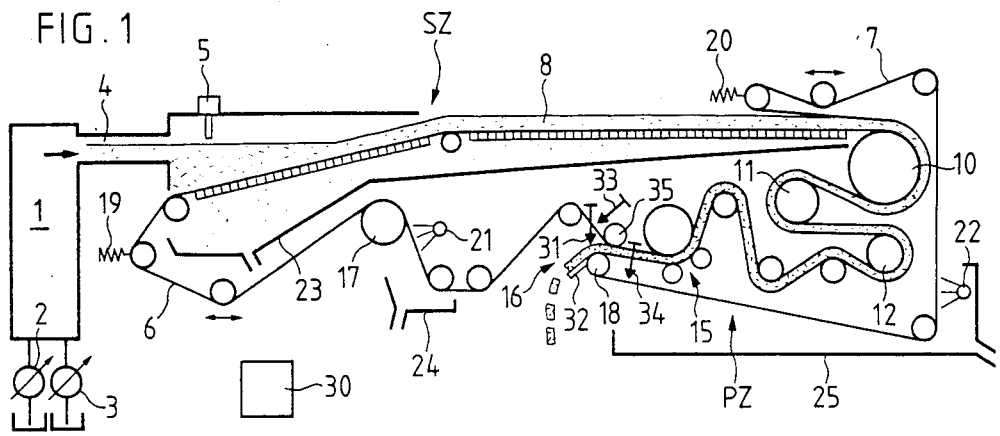
FIG. 1 shows a diagrammatic representation of a perforated belt press.

The invention relates to a perforated or screen belt press, as is diagrammatically represented in FIG. 1. It is installed in a not shown machine frame and has a mixing tank 1, into which a regulatable pump 2 feeds a slurry, particularly a sludge, while a further regulatable pump 3 feeds a flocculant thereinto. When several flocculants are used, several pumps 3 are employed and coordinated with one another. The inflow of slurry and flocculant takes place into the straining zone SZ of the belt filter press via a feed line 4. The straining zone SZ is provided on the feed side with a sensor 5 for measuring the level and its time change. Sensor 5 is part of a control loop for controlling the inflow of slurry and flocculant.

The perforated belt press has two equidirectionally revolving perforated belts, wherein one belt 6, called the lower belt, forms the bottom of the straining zone SZ and the other belt 7, called the upper belt, cooperates therewith.

The straining zone SZ can be constructed in different ways, cf e.g. DE-OS No. 32 42 389. Filtrate flows from the slurry through the bottom of belt 6 forming straining zone SZ and a filter cake 8 is formed thereon. The filter cake then passes into a wedge zone formed by the two perforated belts 6, 7, which subsequently passes into a pressing zone PZ, in which the filter cake is subject an increasing pressure and on guiding round rollers 10, 11 and 12 and after guiding over further rollers is increasingly squeezed out in a high pressure zone 15. The perforated belts 6, 7 are subsequently separated from one another at an outlet 16 and the filter cake is detached from the said belts.

The two perforated belts 6, 7 are in each case driven by a not shown drive via two rubber-coated rollers 17, 18, the belt speed being continuously adjustable up to the maximum value given by the plant.

Belt tensioning means 19, 20 are provided for tensioning the perforated belts 6, 7 and they permit the continuous adjustment of the tension of the two belts. The nip or squeezing pressure is set by setting the compacting pressure of two cooperating rollers, e.g. as in high pressure zone 15, using rollers facing one another on either side of the belts.

It is necessary to permanently clean the perforated belts 6, 7 and for this purpose each is provided with a belt washing plant 21, 22. The filtrate from the straining zone SZ and the pressing zone PZ and the wash water from the belt washing plants 21, 22 are collected in troughs 23, 24, 25 and are jointly or separately removed. Further rollers shown in FIG. 1, but which are not specifically designated, are used for the guidance and straight running of the two perforated belts 6, 7.

For automatically controlling the operation of the perforated belt press described relative to FIG. 1 a plurality of regulating and control mean are provided, which are appropriately programmed and controlled by means of a processor 30. In the latter the control lines come together, these not having been shown in FIG. 1 in order not to make it overcomplicated and also connections to the regulatable pumps 2, 3, the level sensor 5, the drives 17, 18 for perforated belts 6, 7, a device 31 for measuring the dry substance content of the filter cake at the outlet 16 of said cake from the perforated belts and a device 33, 34 for measuring the cleanness of the filtrate after outlet 16.

This perforated belt press can achieve a number of different objectives, e.g. a high dry substance content, favorable economics or a high throughput capacity, while obviously maintaining the prescribed filtrate cleanness.

Figure 2:
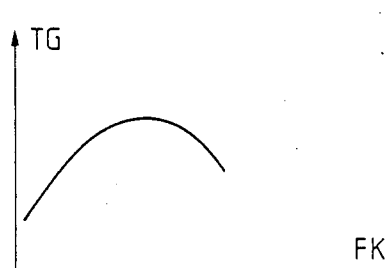
FIG. 2 shows the relationship between the flocculant concentration (flocculant inflow:slurry inflow) and the dry substance content.

The relationship represented in FIG. 2 exists between the flocculant concentration FK and the dry substance content TG. The reduction of the flocculant concentration FK leads to increasing the level at the start of the straining zone SZ in a perforated belt press. With given slurry quality and throughput and also flocculant concentration FK, the level is stabilized to a given point. If the flocculant concentration FK drops below a given limit, cf lines G in FIG. 3, it is then no longer possible to stabilize the level. There is then no longer an adequate perforated belt press drainage in straining zone SZ and overflowing occurs.

Figure 3:
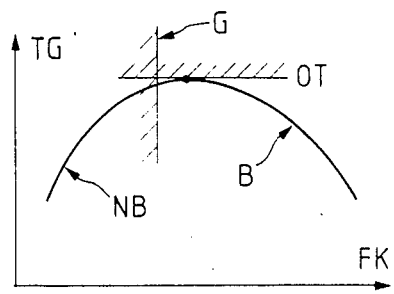
FIG. 3 shows the representation of the stable working zone of a perforated belt press in the graph according to FIG. 2.

The invention is based on the idea that this limit G, which is determined for an individual machine, is linked in a specific manner with the dry substance content TG of the filter cake. Tests carried out on perforated belt presses have surprisingly revealed that the limit G is very close to the optimum dry substance content OT, as shown in FIG. 3. To the right of the limit G is shown the range B which is usable for practical operation and in which the level of straining zone SZ can stabilize, while to the left thereof is shown the range NB which is unsuitable for practical operation.

As a result, the optimization of the dry substance content and the flocculant inflow as a function of the flocculant concentration can be brought about by measuring the level at the start of straining zone SZ. Particular importance is attached to the measurement of the time development of the level, whereas less importance is attached to the measurement of an absolute level for achieving this optimization.

Figure 4:
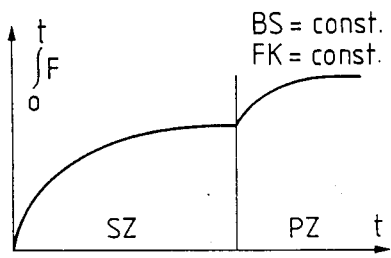
FIG. 4 shows the sum of the filtrate flowing out from the filtering or straining zone and the pressing zone, as a function of time.

FIG. 4 represents over time the sum of the filtrate flowing out from straining zone SZ and pressing zone PZ. The outflow takes place in the manner of a logarithmic function from the time standpoint. The belt tension BS and flocculant concentration FK are assumed as constant. However, the longer the belt of a perforated belt press runs, the more filtrate flows out of the slurry and consequently the dry substance content correspondingly increases.

Figure 5:
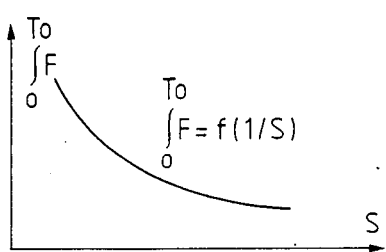
FIG. 5 shows the sum of the outflowing filtrate as a function of the filter cake thickness.

FIG. 5 represents the sum of the filtrate flowing out of the straining and pressing zone as a function of the filter cake thickness. The faster the belt of a perforated belt press runs, the thinner the cake (for constant throughput) and the better the drainage.

Figure 6:
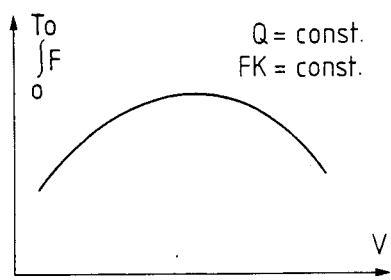
FIG. 6 shows the filtrate quantity as a function of the belt speed of the perforated belt press and FIG. 7 shows the filtrate quantity as a function of the belt tension and/or the perforated belt nip pressure.
Figure 7:
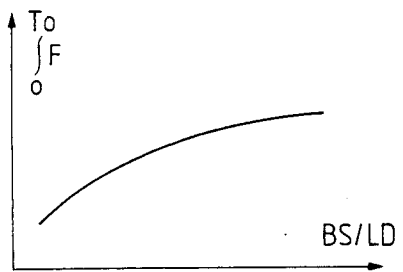

The function according to FIGS. 4 and 5 behave in the reverse manner. It is possible to derive therefrom an optimum belt speed permitting an optimum drainage, cf FIG. 6, which shows the outflowing filtrate F over the belt speed V, the throughput Q and flocculant concentration FK being assumed as constant.

Thus, the optimization of the dry substance content TG with respect to the belt speed calls for a measurement of said content in the filter cake and cannot simply be brought about by running up to a limit value, as is the case with clearly defined functions.

The dry substance content TG is measured by using per se known infrared spectrometry. However, for this process to be usable, the outlet 16 of the perforated belts must be constructed in a particular way, as is diagrammatically shown in FIG. 1. At outlet 16, the two guide pulleys for the perforated belts, i.e. the upper pulley 35 and the lower driving pulley 18 forming the outlet are displaced with respect to one another, so that the spectrometer measuring head can emit as perpendicularly as possible onto the filter cake. In addition, means must be provided on pulleys 18 and 35, which detach the filter cake from the upper belt and force it to remain on the lower belt. It must also be ensured that the filter cake is not pulled off too soon. The detachment from the upper belt and the prevention of pulling off can be achieved by deflectors, whereof a scraper 32 is diagrammatically indicated on the lower pulley 18. A similar, but not shown scraper can also be provided on the upper pulley 35. If the dry substance content is to be measured in accordance with the above method on existing perforated belt presses, the displaced position of pulleys 18, 35 may not be provided. However, hereagain the measurement station can be constructed in such a way that the filter cake remains completely on the lower belt and the measuring head can be so positioned that it can emit approximately perpendicularly onto the filter cake surface.

Another parameter which can be used for optimizing the control of a perforated belt press operation is the belt tension and the nip or squeezing pressure. The belt tension is set by the belt tensioning means 19, 20 shown in FIG. 1, while the nip pressure is set by adjusting the spacing of one or more pressing rollers of the pressing zone PZ, e.g. in the high pressure zone 15, cf FIG. 1, with respect to the opposite roller. These two functions are clearly defined, because the higher the belt tension and/or nip pressure, the better the drainage. The limits are fixed for the individual machine or result from the lateral outflow of filter cake or the cleanness of the filtrate.

The outflow of filter cake laterally from the belts must fundamentally be avoided, so that the spreading of the filter cake leading to this outflow can be established prior to outflow. For this purpose a feeler or probe is arranged on the belt edge and act perpendicularly on the belt, said feeler pressing with a given initial pressure on the belt edge. If the filter cake spreads out, the belt is raised by the higher internal pressure, so that a signal is produced in the feeler. The use of a feeler is advantageous for this measurement, because the feeler can be produced in a simple and watertight manner. Furthermore the measurement can be performed on the belt, which is simpler than if it were necessary to establish a contact with the filter cake. On the basis of the above statements, the optimization of the control of the operation of a perforated belt press with respect to the optimization of the dry substance content TG can be performed in the following way.

(1) The flocculant concentration is optimized through the rapidly reacting flocculant circuit by the level measurement at the start of the straining zone SZ according to FIG. 3. The described dry substance content determination can be used as a control functions.

(2) The rapidly reacting optimization circuits of the belt tension and nip pressure are set to one of the aforementioned limits.

(3) The belt speed is optimized with the described measurement of the dry substance content. This is the slowest acting circuit, because the measurement of the dry substance content only takes place at the end of the perforated belt press.

Whereas one functions independently, two and three can only take place in a sequence.

If, in place of an optimum dry substance content, an optimum economic operation of the perforated belt press is to be achieved, it is possible to use as a basis the simplifying assumption that the operating costs are only due to the flocculant consumption, because it is possible to ignore the influencing of costs as a result of adjustment work.

The discovered link between the dry substance content and the flocculant concentration therefore means that the optimization of the economics can be carried out in the same way as the optimization of the dry substance content.

After describing the various parameters of the perforated belt press and their behavior, it is also possible to achieve further optimizations of the control of the operation of the belt press without involving any difficulty, e.g. using the iteration process, e.g. for achieving an optimum throughput.

In connection with the throughput, a distinction must be made between two optimization modes, i.e. between the maximum throughput for minimum cost and the maximum throughput only. In the first case the throughput is increased until the cake flows out laterally. If there is no drop below the selected dry substance content limit, using an iteration stage the belt tension and nip pressure are reduced, but the belt speed increased and then the throughput is increased again. In the second case, following the aforementioned iteration step, more flocculant is used and then the throughput is again increased.

In the tests leading to the results given in FIG. 3, it was established that the more marked the overflocculation (zone to the right of boundary line G in FIG. 3), the more drainage takes place in the straining zone and the less drainage takes place in the pressing zone. There is an increase in the ratio of filtrate from the straining zone : filtrate from the pressing zone with increasing flocculant concentration. In connection with achieving an optimum throughput, this leads to the sludge reaching the pressing zone in a wetter state and therefore more easily flows out to the side.

It is necessary in a perforates belt press for the filtrate to have a prescribed cleanness. It was found that it was possible to indirectly establish the filtrate cleanness by measuring the cleanness of the belt following pressing zone PZ, i.e. on removing the cake. For this purpose, each belt is radiated through by means of a radiation source 33, 34 cf FIG. 1 and the radiation absorption measured, this constituting a measure of the belt cleanness.

It is to be understood that the invention is not limited to the illustrations described and shown herein, which are deemed to be merely illustrative of the best modes of carrying out the invention, and which are susceptible to modification of form, size, arrangement of parts and details of operation. The invention rather is intended to encompass all such modifications which are within its spirit and scope as defined by the claims.

What is claimed is:

1. A method for controlling the operation of a perforated belt press for filtering a slurry which comprises: providing two superimposed perforated belts with the lower perforated belt forming a straining zone and the two perforated belts together forming a pressing zone to form a filter cake having a dry substance content, wherein the pressing zone is downstream of the straining zone; providing regulatable parameters comprising the drive of the perforated belts, the inflow of slurry, the flocculant addition, the belt tension and the belt nip pressure; wherein in order to optimize the dry substance content of the filter cake and the flocculant inflow, the flocculant quantity in an overflocculation zone is only reduced to the extent that the slurry level at the start of the straining zone is still stabilized, wherein the dry substance content of the filter cake and the flocculant inflow is optimized by a level measurement at the start of the straining zone and wherein the time change of the level is measured, and wherein for optimizing the operation of the perforated belt press, the optimization of the flocculant inflow through the flocculant circuit is combined with the optimization of at least one of the quantities: perforated belt speed, perforated belt tension and perforated belt nip pressure.

2. A method according to claim 1 for filtering sludge.

3. A method according to claim 1 wherein at least one of the belt tension and nip pressure of the perforated belts is optimized by setting at least one of their limit values, with the limit determined for an individual machine, lateral boundary edge of the filter cake directly prior to the outflow and desired filtrate cleanness value.

4. A method according to claim 3 wherein to avoid the outflow of filter cake, the change to the pressure exerted by the filter cake on the belts is established by a feeler positioned in the vicinity of the edge of a belt, acting perpendicularly to the belt surface and an initial pressure is exerted on the belt if the initial pressure set on the feeler is increased by the lateral spreading out of the filter cake by a given amount.

5. A method according to claim 4 wherein the dry substance content of the filter cake is measured infrared spectrometrically at the outlet of the perforated belts, the complete filter cake being deflected onto the lower belt.

6. A method according to claim 1 wherein the speed of the perforated belts is optimized by measuring the dry substance content.

7. A method according to claim 1 wherein the filtrate cleanness is indirectly measured by the belt cleanness after removing the filter cake from the perforated belts at the end of the pressing zone.

8. A method according to claim 7 wherein the perforated belt cleanness is established by measurement of a radiation.

* * * * *